(12) United States Patent
Knee

(10) Patent No.: US 8,553,988 B2
(45) Date of Patent: Oct. 8, 2013

(54) OBJECTIVE PICTURE QUALITY MEASUREMENT

(75) Inventor: Michael James Knee, Petersfield (GB)

(73) Assignee: Snell Limited, Berkshire (GB)

( * ) Notice: Subject to any disclaimer, the term of this patent is extended or adjusted under 35 U.S.C. 154(b) by 214 days.

(21) Appl. No.: 13/030,592

(22) Filed: Feb. 18, 2011

(65) Prior Publication Data

US 2011/0205369 A1    Aug. 25, 2011

(30) Foreign Application Priority Data

Feb. 19, 2010    (GB) .................... 1002865.2

(51) Int. Cl.
*G06K 9/68* (2006.01)
*G06K 9/00* (2006.01)
*G06K 9/36* (2006.01)
*H04N 17/00* (2006.01)
*H04N 17/02* (2006.01)

(52) U.S. Cl.
USPC ............ 382/218; 382/107; 382/286; 348/180

(58) Field of Classification Search
None
See application file for complete search history.

(56) References Cited

U.S. PATENT DOCUMENTS

| | | | |
|---|---|---|---|
| 5,446,492 A * | 8/1995 | Wolf et al. ............. | 348/192 |
| 6,246,435 B1 * | 6/2001 | Patel ..................... | 348/192 |
| 6,360,022 B1 | 3/2002 | Lubin et al. | |
| 6,496,221 B1 * | 12/2002 | Wolf et al. ............. | 348/192 |
| 6,690,839 B1 | 2/2004 | Ferguson | |
| 7,233,349 B2 * | 6/2007 | Mauger et al. ........ | 348/184 |
| 7,668,397 B2 * | 2/2010 | Le Dinh et al. ....... | 382/275 |
| 7,705,881 B2 * | 4/2010 | Okamoto et al. ..... | 348/180 |
| 8,253,803 B2 * | 8/2012 | Okamoto et al. ..... | 348/180 |
| 2005/0135698 A1 * | 6/2005 | Yatsenko et al. ..... | 382/260 |

OTHER PUBLICATIONS

GB1002865.2 International Search Report dated Apr. 20, 2010.

* cited by examiner

*Primary Examiner* — Randolph I Chu
(74) *Attorney, Agent, or Firm* — Michael Best & Friedrich LLP

(57) ABSTRACT

To assess picture impairment due to the interpolation of output images from input images, for example in standards conversion, an output image detail measure is compared with an input image detail measure. One of the image detail measures is obtained by interpolation between image detail measures for at least two images.

16 Claims, 2 Drawing Sheets

OBJECTIVE PICTURE QUALITY MEASUREMENT

RELATED APPLICATION

The present application claims the benefit of United Kingdom Patent Application No. GB 1002865.2, filed Feb. 19, 2010, the entire content of which is hereby incorporated by reference.

FIELD OF INVENTION

This invention concerns objective picture quality measurement in—for example—television, and in a particular instance to the automatic evaluation of the quality of 'standards conversion' processes, such as temporal re-sampling.

BACKGROUND OF THE INVENTION

Objective picture quality measures are important tools in image processing research and in off-line or real-time monitoring of image communications networks and broadcast installations. They are often used to assess the quality of image processing applications by comparing the input and output images. However, known methods are not readily applicable to the evaluation of standards conversion processes. By standards conversion process is meant a process converting an input signal in one format to an output signal in a different format, with each format usually being defined by a nationally or internationally recognised standard and specifying at least the number of the lines per field or frame and the number of fields or frames per second.

Standards converted output images generally have no temporally equivalent input images; and, the output images may have a different sampling structure from the input images. For example interlaced, standard-definition television with a field-rate of 50 Hz could be converted to progressively-scanned high-definition television with a frame-rate of 24 frames per second.

The picture impairments due to standards conversion often vary with time, typically depending on the relative temporal phasing between input and output images. In linear temporal conversion using weighted sums of differently-timed input pixels to create interpolated output pixels, slowly-moving objects become less sharply defined, and fast moving objects give rise to multiple images. In motion-compensated converters incorrect motion vectors and incorrect handling of occlusions can lead to the breakup of objects and the introduction of spurious edges.

The lack of direct temporal equivalence between input and output images and the particular nature of conversion impairments make the use of known objective quality evaluation techniques impractical. There is thus a need for an objective impairment measurement technique specifically appropriate to standards conversion and other processes involving the interpolation of an output image from at least two input images.

SUMMARY OF THE INVENTION

The invention comprises a method and apparatus for assessing picture impairment due to the interpolation of one or more output images from at least two input images, in which an output image detail measure is compared with an input image detail measure, wherein at least one of the said image detail measures is an interpolated detail measure obtained by interpolation between image detail measures for at least two images of a sequence of images.

The detail measure may be a number or group of numbers that represents the degree of detail in an image or a block of an image. The detail measure may be obtained in a wide variety of ways including taking differences between neighbouring pixel values or gradients in pixel values and then aggregating those differences or gradients over the image or image part. In a simple form the differences are rectified (or the magnitude taken) and then summed. Many other techniques are of course available for producing a number representative of the degree of detail in a picture block. Filtering techniques can be employed.

The interpolation of image detail measures for two images may be a weighted average of the respective image detail measures, with the weighting determined by the phase of a particular output image with respect to the input images. In the simple case where the output image is timed exactly half way between two input images, interpolation of image detail measures for the two input images might consist of a simple mean. More usually, where the frame rates of the input and output standards are not equal and not multiples one of another, the weighting will vary from one filed or frame pair to the next. This is directly analogous to the temporal interpolation of images and a wide variety of known techniques for the temporal interpolation of images can be applied here to the interpolation of image detail measures.

Suitably, impairment is characterised by at least a measure that represents the excess of the detail measure for an output image over the detail measure for an input image.

Alternatively, impairment is characterised by at least a measure that represents the variation in the said comparison of detail measures.

In some embodiments the variation at the frequency that represents the difference between the repetition frequency of input images and the repetition frequency of output images is evaluated.

The variation at half the difference between the repetition frequency of input images and the repetition frequency of output images may also be evaluated.

In a preferred embodiment images are divided into blocks and the said detail comparison is made between co-located blocks.

Impairment measures evaluated for at least two images in a sequence of images can be combined.

BRIEF DESCRIPTION OF THE DRAWINGS

An example of the invention will now be described with reference to the drawings in which.

DETAILED DESCRIPTION OF THE INVENTION

Figure 1:
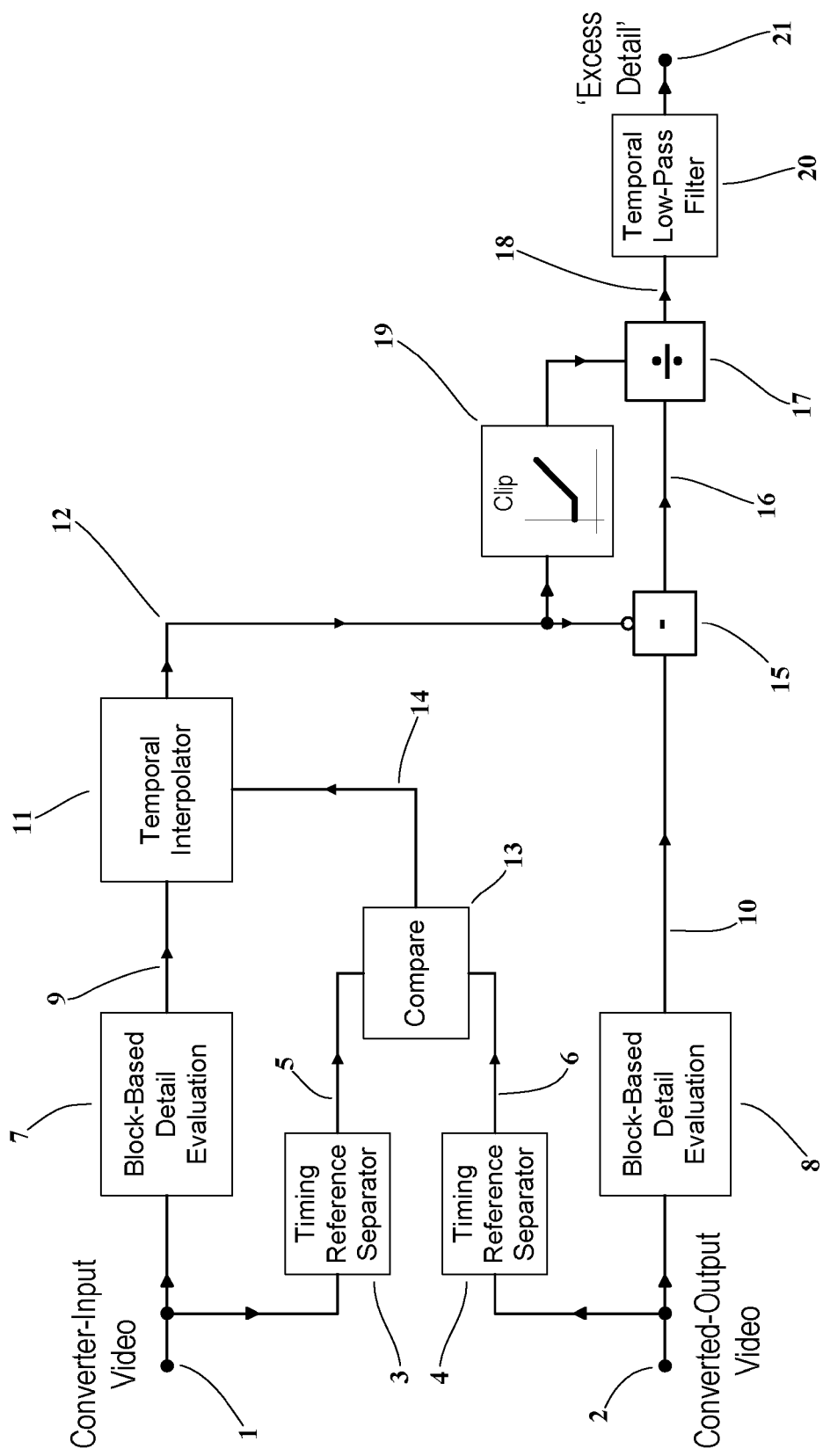
FIG. 1 shows a block diagram of a system for comparing the output of a standards conversion process with its input so as to obtain a measure of excess detail.

In one standards conversion quality assessment according to the invention the detail content of input and output images is evaluated and compared, so as to derive a time varying measure indicative of the level of conversion related artefacts in the output image. A suitable system is shown in FIG. 1.

This exemplary system operates to process streaming data, however the skilled person will appreciate that analogous processing can be carried out on stored or non-real-time image data. Referring to FIG. 1, video data (1) corresponding to the input of the conversion process to be evaluated is input at a first input terminal; and video data (2) corresponding to the output of the conversion process to be evaluated is input at a second input terminal. It is assumed that the converted data has been delayed according to the propagation delay of the conversion process so that at a given instant both streams portray the same image content. The two data streams each comprise pixel value information and timing information. They may be in any convenient format, for example according to International Telecommunications Union Radiocommunication Sector (ITU/R) Recommendation 656. We will assume initially that the two input video streams are 2:1 interlaced and have different field rates.

The video data streams (1) and (2) are applied to respective timing reference separators (3) and (4) that extract converter-input field-timing data (5) and converted-output field-timing data (6) from their respective inputs. The video data streams (1) and (2) are also input to respective, identical block-based detail evaluation processes (7) and (8) that divide each of their respective input fields of pixel values into blocks, and derive a measure of image detail for each block. The block-based detail evaluation processes (7) and (8) make use of the respective timing reference signals (5) and (6) to identify the pixel values for each field and to divide each field into an array of contiguous blocks of pixels. A suitable block structure divides each field into 32 rectangular blocks orthogonally arranged in eight rows and four columns, and this structure will be assumed in the following description.

The detail measure for each block is in this example the sum of the magnitudes of pixel-value differences between horizontally adjacent pixels in the block; the sum is normalised by dividing by the number of pixels that comprise the block. Typically luminance-value differences are used, though other pixel-value parameters may be more representative in some cases. A suitable block detail measure is given by:

$$D_B = \{\Sigma |Y_x - Y_{x+1}|\} \div N_B$$

Where:
$D_B$ is the detail measure for block B;
$Y_x$ is the luminance value of a pixel at horizontal position x;
the summation is made over all the pixels of block B;
$N_B$ is the number of pixels in block B; and,
$|x|$ is the absolute magnitude of x.

The outputs of detail evaluation processes (7) and (8) are respective sets of 32 detail values for each input field. The detail evaluation process (7) provides sets of detail values (9) at the field rate of converter-input video data (1), whose phase is indicated by the timing reference data (5); and, the detail evaluation process (8) provides sets of detail values (10) at the field rate of the converted-output video data (2), whose phase is indicated by the timing reference data (5).

In order to assess the quality of the standards conversion it is necessary to compare the converter-input detail values (9) with the converted-output detail values (10). However these sets of block detail values correspond to different image timings, i.e. the input fields and the converted fields are asynchronous and they cannot be compared in a meaningful way. This difficulty is overcome by temporally interpolating the converter-input detail values (9) in a temporal interpolator (11) so as to generate temporally-interpolated detail values (12) that are co-timed with the converted-output detail values (10).

The converter-input field-timing data (5) is compared with the converted-output field-timing data (6) in a field-phase comparator (13) to generate a field phase difference signal (14) that indicates the phase of each converted output field with respect to the temporally-adjacent converter-input fields. The field phase difference signal (14) thus controls the temporal interpolator (11) to form a weighted sum of spatially coincident converter-input block detail values at the converted-output field times as indicated by the output field-timing data (6). The output (12) from the temporal interpolator (11) comprises sets of block detail values that correspond in timing and block positions with respective sets of the converted output block detail values (10). That is to say the temporal interpolator (11) derives interpolated sets of block detail values that are synchronised in frequency and phase with the converted-output block detail values (10).

The temporal interpolator (11) can use any known temporal interpolation method but it is desirable that negative-going overshoots are not generated, as could be the case if an interpolation aperture having negative FIR filter coefficients were used. Such overshoots could give a false indication of excess detail in the converted output image. For this reason linear interpolation of the block detail values is preferred.

The temporally-interpolated detail values (12) are subtracted from the corresponding co-timed converted-output detail values (10) in a subtractor (15) to create a block-based 'excess detail' signal (16). This signal comprises, for each converted output block, the difference between the detail value for that block and the detail value for the co-located, temporally interpolated input block. If the converted output fields have less detail than the converter input field then the excess detail signal (16) will comprise negative values. However, if the converted output fields have more detail than the converter input fields, perhaps because spurious edges or other artefacts have been introduced by the conversion process, then the excess detail signal (16) will comprise positive values.

The magnitudes of the block values comprising the excess detail signal (16) will depend on the content of the images being converted. In order to lessen this dependency on the content, the excess detail signal (16) is normalised in a divider (17) to create a normalised excess detail signal (18). The normalisation may comprise division of the excess detail values by corresponding temporally-interpolated detail values; there will in other applications be alternative techniques for normalising the excess detail signal. In order to avoid the generation of large, unrepresentative normalised values from blocks having very little detail, the temporally-interpolated detail values (12) may be clipped in a clipper (19) that replaces values lower than a small positive threshold value by that threshold value. The output of the clipper (19) forms the divisor input of the divider (17).

The normalised excess detail signal (18) is filtered in a temporal low-pass filter (20) to give an output, block-based excess detail measure (21). This signal comprises a set of 32 values (one for each block) for every field of the converted-output video data (2). The temporal filter helps to avoid unrepresentative outputs due to sudden changes in the input video, for example shot changes. A three-tap median filter is suitable.

The output block-based excess detail measure (21) is indicative of the quality of the standards conversion process that derived the converted-output video data (2) from the converter-input video data (1). If the conversion is good, the block values will be low and unchanging; if the conversion is bad, positive values are likely, and the values will vary regularly at frequencies related to the difference in field frequency between the input and the converted output.

Figure 2:
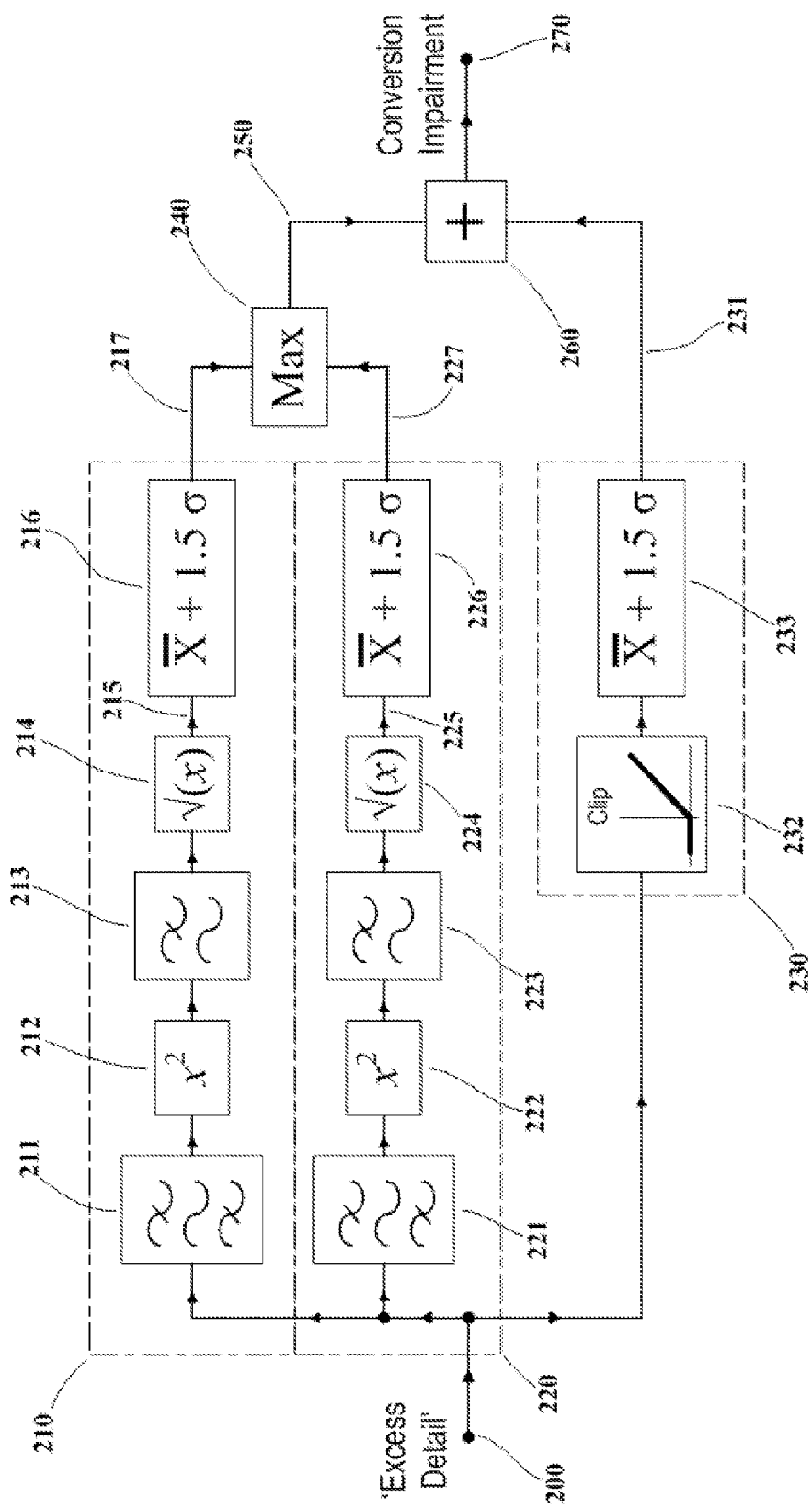
FIG. 2 shows a block diagram of a system for deriving a measure of picture impairment due to standards conversion from a measure of excess detail.

FIG. 2 shows how a field-rate, block-based excess detail measure (200) can be processed to obtain a field-rate, scalar measure of the picture impairment due to standards conversion (270). This metric has a single value for every field of the converted video sequence; values close to zero indicate high quality conversion and high values indicate the presence of picture impairments characteristic of inferior conversion.

The block-based excess detail measure (200) (which is preferably the output (21) from the system of FIG. 1) is input to three analysis chains whose outputs are combined so as to obtain a single conversion impairment measure output (270).

The first analysis chain (210) detects variation of the excess detail at the field-frequency difference between the standards converter output and its input. In this chain the sets of block-based excess detail values (200) are temporally filtered in a temporal band-pass filter whose pass-band is centred on the difference-frequency:

$$\Delta_f = |f_1 - f_2|$$

Where:
$f_1$ is the converter input field frequency;
$f_2$ is the converted output field frequency; and,
$|x|$ is the magnitude of x.

The temporally-filtered, block-based excess detail measures at the output of the band-pass filter (211) are squared (212) and temporally low-pass filtered (213). The combined effect of these processes is similar to rectification in that a low-frequency component related to the magnitude of frequency components within the band-pass filter passband is created. Frequency-doubled components are also created and these are removed by the low-pass filter (213). The resulting sets of values have their square roots taken (214) to obtain, for each field of the converted-output video data (2), a set of 32 values approximately proportional to the amplitude of the variation in detail at the field-difference frequency $\Delta_f$.

These, field-rate, sets of 32 block $\Delta_f$-variation values (215) are converted to a field-rate stream of single values (217) in a statistical combining process (216). This process calculates the mean and standard deviation of the block $\Delta_f$-variation values for each field and outputs a combined value:

$$= \overline{X} + 1.5\sigma$$

Where:
$\overline{X}$ is the mean of the set of 32 values; and,
$\sigma$ is the standard deviation of the set of 32 values.

A second analysis chain (220) detects variation of the excess detail at half the field-frequency difference between standards converter output and its input. The second analysis chain (220) is identical to the first analysis chain (210) apart from the filters. Equivalent functions have equivalent reference numerals in FIG. 2 with the second digit '2' replaced by '1'. The band-pass filter (221) is centred at $\Delta_f/2$.

Suitable responses for the band-pass filters (211) and (221) can be obtained by transforming Gaussian low-pass characteristics with cutoff frequencies approximately equal to one sixth of the respective difference frequency, to band-pass characteristics centred on the respective difference frequency (either $\Delta_f$ or $\Delta_f/2$). Suitable characteristics for the low-pass filters (213) and (223) are Gaussian with cutoff frequencies of one half of the respective difference frequency.

A third analysis chain (230) produces a field-rate stream of 'spurious-detail' measures (231) from the block-based excess detail measure (200). A clipper (232) replaces the values of any of the block-based excess detail measure (200) values that are negative by zero. The clipped values for each field are then statistically combined (233), in the same way as in the statistical combiners (216) and (226) to create the field-rate stream of 'spurious-detail' measures (231).

The output (217) of the first analysis chain (210), and the output (227) of the second analysis chain (220) are combined in a maximum value determination block (240), which outputs the higher of its inputs to give a field-rate stream of single-value detail variation measures (250). The two different frequency-based measures are combined because the subjective detriment due to detail variation appears to depend mainly on the largest variation, even if two frequency components are present.

An overall conversion impairment measure (270) is obtained by combing the spurious detail measure (231) for each field with the corresponding detail variation measure (250) for that field in an adder (260). This output is a linear measure of impairment magnitude in units equivalent to the pixel values used in the block-based detail evaluation, for example luminance values in the case described above and shown in FIG. 1. Video engineers are familiar with quantities expressed in decibels and it is therefore often convenient to take the logarithms (base 10) of the values output from the system of FIG. 2, multiply them by 20 and subtract a suitable constant to obtain values that can be related to other video impairment measurements.

There are a number of alternative implementations of the invention. These include techniques described below.

It may be more convenient to temporally interpolate the converted-output detail measures to align them with un-interpolated converter-input detail measures to enable them to be compared.

The excess detail measure need not be combined with a measure of detail variation, or the measured impairment may depend only on variation of detail. Where neither the converter input nor the converter output is interlaced, there is no need for the half-difference-frequency analysis block (220). The choice of the frequencies at which the detail variation is analysed will depend on the exact nature of the temporal interpolation in the standards conversion process. However, the skilled person will be able to determine the rate of variation of the converter's temporal interpolation phase and select this frequency, or one or more related frequencies (harmonics or sub-harmonics), for analysis.

Additional temporal filtering can be used to combine results from several fields or frames and this can be applied at the block level or at the field or frame level. Pixel-values other than luminance values can be used. Other detail measures can be used, such as pixel energy measures including measures derived from spatial high-pass filters.

The converter input and its output are likely to have different spatial sampling structures and may have unequal spatial frequency responses. In this case it may be necessary to correct the detail difference values between converter-input and converted-output images to allow for inherent differences in their detail content that are unrelated to standards conversion.

When the invention is applied to stored or non-real time image data the spatial and temporal positions of pixels may not be indicated by timing reference signals as in the example described above. In this case pixel positions can be inferred in known manner from file structure conventions or memory addresses.

In some cases there may be no indication at all of precise temporal alignment between the converter-input and converted-output images. In such cases, a known correlation process may be carried out between the two detail signals in order to recover temporal alignment information.

Various features and advantages of the invention are set forth in the following claims.

The invention claimed is:

1. A method of using a processor to provide an assessment of picture impairment due to the interpolation of an output image in a sequence of output images from at least two input images in a sequence of input images, the method comprising the steps of:
    receiving at the processor said sequence of input images at an input image repetition frequency;
    forming at least one input image detail measure from each input image;
    receiving at the processor said sequence of output images at an output image repetition frequency;
    forming at least one output image detail measure from each output image;
    interpolating image detail measures using image detail measures from at least two input images or at least two output images; and
    comparing an image detail measure from one of the input or output image sequences with an interpolated image detail measure from the other of the input or output image sequences.

2. A method according to claim 1, in which the interpolated image detail measure is a weighted average of the respective image detail measures for two images, with the weighting determined by the phase of a particular output image with respect to the input images.

3. A method according to claim 2, where said image repetition frequencies of the input and output image sequences are not equal and not multiples one of another and the weighting varies from one image to the next.

4. A method according to claim 1, in which impairment is characterised by at least a measure that represents the excess of the detail measure for an output image over the detail measure for an input image.

5. A method according to claim 1, in which impairment is characterised by at least a measure that represents the variation in the said comparison of detail measures.

6. A method according to claim 5, in which the variation at the frequency that represents the difference between said repetition frequency of input images and said repetition frequency of output images is evaluated.

7. A method according to claim 5, in which the variation at half the difference between said repetition frequency of input images and said repetition frequency of output images is evaluated.

8. A method according to claim 1, in which images are divided into blocks and the said detail comparison is made between co-located blocks.

9. A method according to claim 1, in which impairment measures evaluated for at least two images in a sequence of images are combined.

10. Apparatus for assessing picture impairment due to the interpolation of an output image in a sequence of output images from at least two input images in a sequence of input images, comprising:
    an input image detail evaluator for receiving said sequence of input images and forming at least one input image detail measure from each input image; an output image detail evaluator receiving said sequence of output images and forming at least one output image detail measure from each output image; an interpolator for interpolating image detail measures using image detail measures from at least two input images or at least two output images; and a combiner for combining an image detail measure from one of the input or output image sequences with an interpolated image detail measure from the other of the input or output image sequences to provide a measure of picture impairment.

11. Apparatus according to claim 10, further comprising a timing comparator for comparing the respective timings of the input image sequence and the output image sequence and providing an interpolation phase control signal to the interpolator.

12. Apparatus according to claim 10, in which the interpolator is adapted to form a weighted average of the respective image detail measures for two images, with the weighting determined by the phase of a particular output image with respect to the input images.

13. Apparatus according to claim 10, further comprising a filter arrangement adapted to identify variation in said measure of picture impairment at the frequency that represents the difference between said repetition frequency of input images and said repetition frequency of output images.

14. Apparatus according to claim 13, further comprising a filter arrangement adapted to identify variation in said measure of picture impairment at the frequency that represents half the difference between said repetition frequency of input images and said repetition frequency of output images is evaluated.

15. Apparatus according to claim 10, further comprising a filter arrangement for combining impairment measures evaluated for at least two images in a sequence.

16. A non-transitory computer program product containing instructions causing programmable apparatus to implement a method of providing an assessment of picture impairment due to the interpolation of an output image in a sequence of output images from at least two input images in a sequence of input images, the method comprising the steps of:
    receiving at the processor said sequence of input images;
    forming at least one input image detail measure from each input image;
    receiving at the processor said sequence of output images;
    forming at least one output image detail measure from each output image;
    interpolating image detail measures using image detail measures from at least two input images or at least two output images; and
    comparing an image detail measure from one of the input or output image sequences with an interpolated image detail measure from the other of the input or output image sequences.

* * * * *